US010952418B2

(12) United States Patent
 Ikebukuro

(10) Patent No.: US 10,952,418 B2
(45) Date of Patent: Mar. 23, 2021

(54) GEAR MECHANISM FOR A FISHING REEL

(71) Applicant: Shimano Inc., Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/269,937

(22) Filed: Feb. 7, 2019

(65) Prior Publication Data

US 2019/0166817 A1 Jun. 6, 2019

Related U.S. Application Data

(63) Continuation of application No. 15/646,547, filed on Jul. 11, 2017, now Pat. No. 10,244,744.

(30) Foreign Application Priority Data

Oct. 11, 2016 (JP) .............................. JP2016-199773

(51) Int. Cl.
| *A01K 89/06* | (2006.01) |
| *A01K 89/00* | (2006.01) |
| *F16H 57/00* | (2012.01) |
| *F16F 15/121* | (2006.01) |
| *A01K 89/015* | (2006.01) |
| *A01K 89/01* | (2006.01) |

(52) U.S. Cl.
 CPC ............ *A01K 89/006* (2013.01); *A01K 89/01* (2013.01); *A01K 89/015* (2013.01); *A01K 89/0186* (2015.05); *F16F 15/1215* (2013.01); *F16H 57/0006* (2013.01); *A01K 89/01081* (2015.05)

(58) Field of Classification Search
 CPC .. A01K 89/006; A01K 89/0186; A01K 89/01; A01K 89/015; A01K 89/01081; F16F 15/1215; F16F 57/0006
 See application file for complete search history.

(56) References Cited

U.S. PATENT DOCUMENTS

| 5,244,166 A | * | 9/1993 | Oi | .......................... F16B 41/002 |
| | | | | 242/284 |
| 5,690,289 A | * | 11/1997 | Takeuchi | ............. A01K 89/006 |
| | | | | 242/282 |
| 2012/0048981 A1 | * | 3/2012 | Ohara | ................ A01K 89/0108 |
| | | | | 242/230 |
| 2014/0332615 A1 | * | 11/2014 | Braun | ................ A01K 89/0108 |
| | | | | 242/236 |

(Continued)

FOREIGN PATENT DOCUMENTS

JP  2004-24231 A  1/2004

OTHER PUBLICATIONS

European Search Report of corresponding EP Patent Application No. 17 19 4322.8 dated Mar. 2, 2018.

*Primary Examiner* — Zakaria Elahmadi
(74) *Attorney, Agent, or Firm* — Global IP Counselors, LLP

(57) ABSTRACT

A gear mechanism for a fishing reel includes a drive gear, a handle, and a vibration damper. The drive gear includes a gear having a prescribed gear diameter, and a drive gear shaft rotated together with the gear and having a smaller dimension than the prescribed gear diameter. The handle rotates the drive gear shaft. The vibration damper is disposed between the drive gear shaft and the handle, and dampens the transmission of the vibration of the drive gear.

7 Claims, 14 Drawing Sheets

(56) References Cited

U.S. PATENT DOCUMENTS

| | | | |
|---|---|---|---|
| 2016/0106082 A1* | 4/2016 | Lee | A01K 89/0105 242/230 |
| 2016/0113261 A1* | 4/2016 | Hirayama | A01K 89/011221 242/319 |
| 2016/0150769 A1* | 6/2016 | Hiraoka | A01K 89/0108 242/230 |
| 2017/0258063 A1* | 9/2017 | Ikebukuro | A01K 89/0183 |
| 2017/0303520 A1* | 10/2017 | Hyun | A01K 89/0186 |

\* cited by examiner

GEAR MECHANISM FOR A FISHING REEL

CROSS-REFERENCE TO RELATED APPLICATIONS

This application is a continuation application of U.S. patent application Ser. No. 15/646,547, filed on Jul. 11, 2017, which claims priority to Japanese Patent Application No. 2016-199773, filed on Oct. 11, 2016. The entire disclosures of U.S. patent application Ser. No. 15/646,547 and Japanese Patent Application No. 2016-199773 are hereby incorporated herein by reference.

BACKGROUND

Field of the Invention

The present invention relates to a gear mechanism for a fishing reel.

Description of the Related Art

In general, fishing reels include spinning reels, dual bearing reels, and the like. These reels comprise a handle assembly having a handle arm, and a gear mechanism that transmits the rotation of the handle arm to a spool. For example, in the spinning reel disclosed in Japanese Laid-Open Patent Publication No. 2004-24231, when a handle arm is rotated in a line-winding (reeling) direction, rotation is transmitted from the handle arm to the spool, via a handle shaft portion, a main gear shaft, a main gear, and a pinion gear.

In Japanese Laid-Open Patent Publication No. 2004-24231, a buffer member is disposed between the main gear shaft and the handle assembly. It is possible to suppress axial rattling between the main gear shaft and the handle shaft with the buffer member.

On the other hand, for example, when the handle arm is rotated in the line-winding (reeling) direction, vibration is generated by the meshing of the gears, such as the main gear and the pinion gear. In a conventional gear mechanism, this vibration due to the meshing of gears is transmitted to the handle arm, causing deterioration in the rotation feeling during rotation of the handle.

SUMMARY

Therefore, if the transmission of vibration due to meshing of gears to the handle arm can be dampened, it is possible to improve the rotation feeling.

The object of the present invention is to improve the rotation feeling by damping the vibration caused by the meshing of gears, which is transmitted to the handle arm, in a gear mechanism for a fishing reel.

The gear mechanism for a fishing reel according to one aspect of the present invention comprises a drive gear, a handle, and a vibration damper. The drive gear comprises a gear that has a prescribed gear diameter and a drive gear shaft that is rotated together with the gear and that has a smaller diameter than a prescribed gear diameter. The handle rotates the drive gear shaft. The vibration damper is disposed between the drive gear shaft and the handle, and dampens the transmission of the vibration of the drive gear.

In this gear mechanism for a fishing reel, it is possible to dampen the transmission of the vibration of the drive gear by the vibration damper disposed between the drive gear shaft and the handle. It is thereby possible to achieve an improvement in the rotation feeling.

Preferably, the vibration damper is elastically deformable, engages an engagement portion of a tubular member, and is made of an elastic material with a lower rigidity than the tubular member. In this embodiment, the vibration damper engages the engagement portion of the tubular member, and the rotation of the handle arm is transmitted to the drive gear shaft. Accordingly, the vibration due to the engagement of the gears is transmitted to the handle arm via the vibration damper, and the vibration is dampened by the vibration damper. It is thereby possible to achieve an improvement in the rotation feeling.

Preferably, the engagement portion of the tubular member engages the drive gear shaft after the vibration damper has been elastically deformed by a prescribed amount; this is an embodiment in which the rotational load is high and after the elastically deformable vibration damper has been elastically deformed by a prescribed amount, the handle shaft engages the engagement portion of the tubular member and rotation is transmitted; therefore, even if a high load is applied in the line-winding (reeling) direction, the rotation of the handle arm can be reliably transmitted to the drive gear shaft.

Preferably, the drive gear shaft has a large-dimension portion, and a small-dimension portion that is formed to have a smaller dimension than the dimension of the large-dimension portion. The large-dimension portion and the small-dimension portion are disposed in the inner peripheral portion of the tubular member. The vibration damper is disposed on the outer periphery of the small-dimension portion. The large-dimension portion engages the engagement portion of the tubular member after the elastic member has been elastically deformed by a prescribed amount. In this embodiment, the vibration damper and the drive gear shaft are capable of affecting rotation with a simple configuration.

Preferably, the tubular member is made of metal.

Preferably, the handle comprises a handle arm that extends in a direction that axially intersects the drive gear shaft, and a first transmitting member that is non-rotatably coupled to the handle arm and that has an engagement portion. In addition, the handle further comprises a second transmitting member that transmits the rotation of the handle to the drive gear shaft. The vibration damper is elastically deformable, engages the first transmitting member, and is made of elastic with a lower rigidity than the first transmitting member. The second transmitting member has a higher rigidity than the vibration damper and engages the engagement portion of the first transmitting member after the vibration damper has been elastically deformed by a prescribed amount to transmit the rotation of the handle to the drive gear shaft.

In this embodiment, the elastic member engages the engagement portion of the first transmitting member and the rotation of the handle arm is transmitted to the drive gear shaft until the elastically deformable vibration damper is elastically deformed by a prescribed amount. That is, if the rotational load is low, the rotational force is transmitted via the vibration damper. Accordingly, the vibration due to the engagement of gears is transmitted to the handle arm via the vibration damper, and the vibration is damped by the vibration damper. It is thereby possible to achieve an improvement in the rotation feeling.

On the other hand, if the rotational load is high, the second transmitting member engages the engagement portion of the first transmitting member to transmit the rotation after the vibration damper is elastically deformed by a prescribed amount; therefore, even if a high load is applied in the line-winding (reeling) direction, rotation of the handle arm can be reliably transmitted to the drive gear shaft.

Preferably, the engagement portion of the first transmitting member has at least one pawl receiving portion. The vibration damper comprises an elastic pawl that engages the at least one pawl receiving portion. The second transmitting member comprises a transmission pawl having a circumferential width that is narrower than the circumferential width of the elastic pawl of the vibration damper. The transmission pawl engages the pawl receiving portion after the elastic pawl of the vibration damper has been elastically deformed by a prescribed amount.

In this embodiment, the rotation is reliably transmitted by making the engagement portion a pawl receiving portion. In addition, by forming the width of the transmission pawl narrower than the width of the elastic pawl, the pawl receiving portion and the elastic pawl are engaged until the elastic pawl is elastically deformed by a prescribed amount, such that that the vibration due to the engagement of gears can be damped.

Preferably, the first transmitting member is metal with a plate shape, having a through-hole in the middle through which at least a portion of the drive gear shaft can be inserted. The engagement portion of the first transmitting member is recessed radially outwardly from the through-hole. In this embodiment, it is possible to realize the transmission of rotation via the vibration damper and the transmitting member with a simple configuration, even in a dual bearing reel.

Preferably, the first transmitting member is metal with a tubular shape, one end of which is non-rotatably coupled with the handle arm. The engagement portion of the first transmitting member is recessed axially from the end surface of the other end of the first transmitting member.

Preferably, the handle arm comprises a female threaded portion. The first transmitting member is fixed to the handle arm by a locking screw mounted in a locking hole formed on the radially outer side of the through-hole, being threaded into the female threaded portion. In this case, the first transmitting member and the handle arm can be reliably fixed.

Preferably, the handle comprises a handle arm that extends in a direction that axially intersects the drive gear shaft, a first transmitting member that is non-rotatably coupled to the handle arm and that has an engagement portion, and a second transmitting member that has an engaged portion to which rotational force is transmitted from the engagement portion of the first transmitting member. The vibration damper is disposed so as to be capable of abutting the engaged portion of the first transmitting member and the engaged portion of the second transmitting member, transmits the rotation of the first transmitting member to the second transmitting member, has a lower rigidity than the first and second transmitting members, and can be elastically deformed.

In this embodiment, the rotation of the handle arm is transmitted via the vibration damper. Accordingly, it is possible to dampen the vibration due to the engagement of gears when the handle arm is rotated in the line-winding (reeling) direction with the vibration damper. It is thereby possible to achieve an improvement in the rotation feeling.

According to the present invention, since the vibration due to the engagement of gears that is transmitted from the gears to the handle arm can be dampened, it is possible to achieve an improvement in the rotation feeling.

DETAILED DESCRIPTION OF THE INVENTION

First Embodiment

Figure 1:
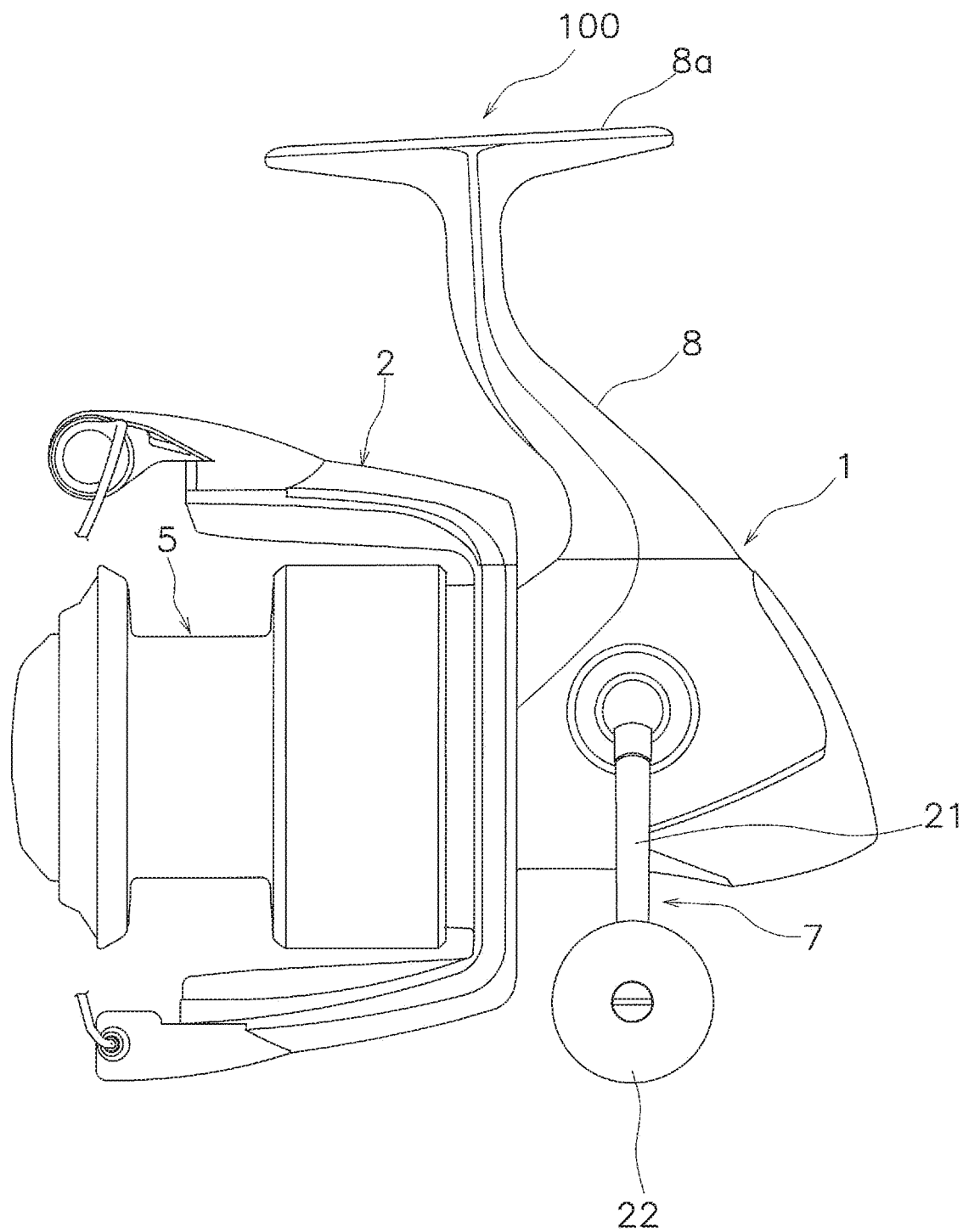
FIG. 1 is a side view of the spinning reel according to a first embodiment.
Figure 2:
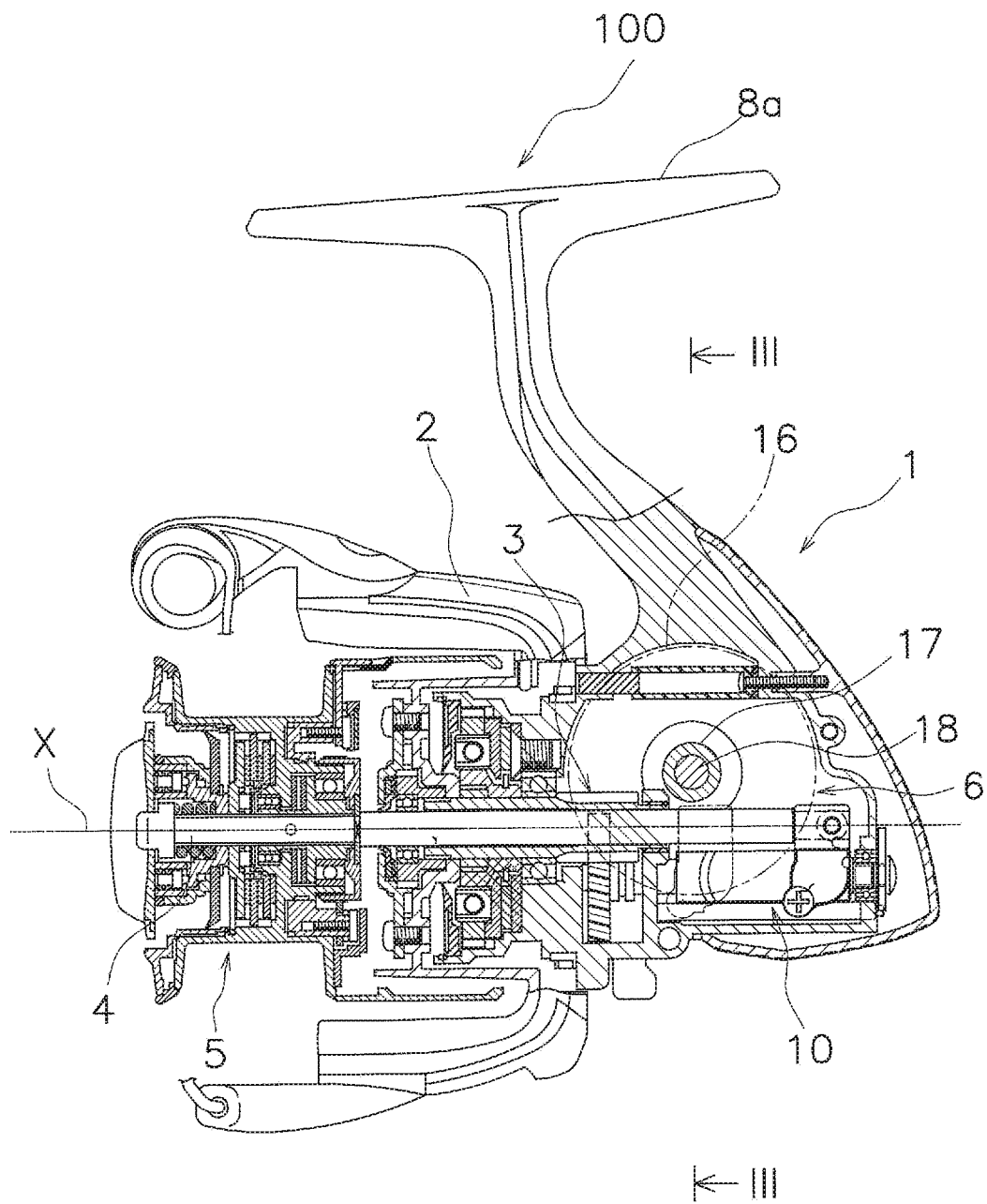
FIG. 2 is a side cross-sectional view of the spinning reel according to the first embodiment.

FIG. 1 and FIG. 2 show a side view and a cross-sectional view of a spinning reel 100 to which the first embodiment of the present invention is employed. In the following description, "front" indicates the direction in which the fishing line is unreeled; specifically, left in FIG. 1 and FIG. 2 is the "front."

The spinning reel 100 comprises a reel body 1, a rotor 2, a pinion gear 3, a spool shaft 4, a spool 5, and a gear mechanism 6 having a drive shaft 17 and a handle shaft 18.

Figure 3:
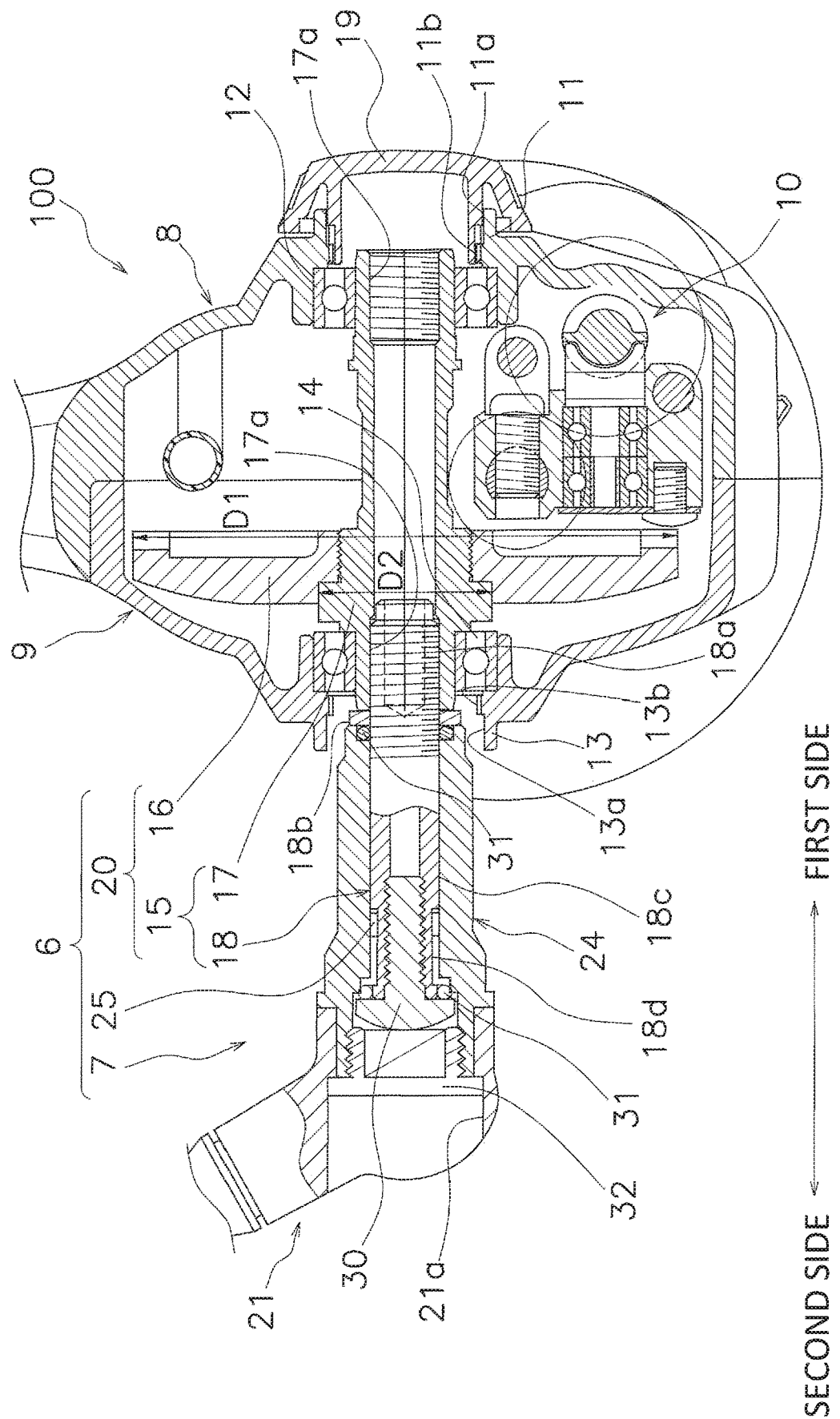
FIG. 3 is a cross-sectional view taken along line III-III in FIG. 2.

As shown in FIG. 3, the reel body 1 comprises a case part 8 and a lid body 9. The lid body 9 is attached to the case part 8 using, for example, a bolt (not shown). The reel body 1 comprises an internal space that is defined by the case part 8 and the lid body 9. A portion of the gear mechanism 6, and an oscillating mechanism 10 for evenly winding a fishing line, are housed in the internal space.

The case part 8 comprises a mounting portion 8a that extends in the longitudinal direction, as shown in FIG. 1, and a tubular first boss portion 11, as shown in FIG. 3. The mounting portion 8a is the portion that is attached to a fishing rod.

The first boss portion 11 is formed on a first side of the reel body 1 (refer to FIG. 3). The first boss portion 11 comprises a first through-hole 11a. The first through-hole 11a is a through-hole for passing a handle shaft 18 therethrough. A first female threaded portion 11b, in which is formed a female thread, is formed on the inner surface of the first through-hole 11a. A first axle bearing member 12 for supporting a first side of the driveshaft 17 is attached to the inner surface of the first boss portion 11.

The lid body 9 comprises a tubular second boss portion 13. The second boss portion 13 is formed on a second side of the reel body 1 (refer to FIG. 3). The second boss portion 13 comprises a second through-hole 13a. The second through-hole 13a is a through-hole for passing a handle shaft 18 therethrough. A second female threaded portion 13b, in which is formed a female thread, is formed on the inner surface of the second through-hole 13a. A second axle bearing member 14 for supporting a second side of the driveshaft 17 is attached to the inner surface of the second boss portion 13.

The rotor 2 is a member for winding a fishing line onto the spool 5. As shown in FIG. 2, the rotor 2 is fixed to the front portion of the pinion gear 3, and is integrally rotated with the pinion gear 3.

The pinion gear 3 is provided in the reel body 1. In particular, the pinion gear 3 is formed in a tubular shape, and extends forward from the reel body 1. The spool shaft 4 extends inside the pinion gear 3. Meanwhile, the pinion gear 3 is supported in the reel body 1 via a plurality of axle bearing members (not shown).

The spool shaft 4 is disposed in the reel body 1. In particular, the spool shaft 4 extends forward from inside the reel body 1.

The spool 5 is a member onto which the fishing line is wound. The spool 5 is integrally reciprocated with the spool shaft 4 in the longitudinal direction.

As shown in FIG. 3, the gear mechanism 6 comprises a drive gear 20, a handle 7, and a vibration damper 25. The drive gear 20 comprises a drive gear shaft 15 and a gear 16 that has a prescribed gear diameter.

The drive gear shaft 15 comprises a driveshaft 17 and a handle shaft 18.

The driveshaft 17 is a tubular shaft. Both ends of the driveshaft 17 are rotatably supported in the reel body 1 by first and second axle bearing members 12, 14. Further, a female threaded portion 17a, on the inner surface of which is formed a female thread, is formed at both ends of the driveshaft 17. The driveshaft 17 is formed to have a smaller diameter than the gear diameter of the gear 16.

The handle shaft 18 extends through the second through-hole 13a, and a portion thereof is disposed on the inner periphery of the driveshaft 17. As shown in FIG. 3, the dimension of the handle shaft 18 is smaller than the diameter of the gear 16. A cap member 19, which is threaded into the first female threaded portion 11b, is attached to cover the first through-hole 11a, through which the handle shaft 18 does not extend. Meanwhile, a cap member 19 can also be threaded into the second female threaded portion 13b of the second through-hole 13a. Conversely to FIG. 3, if the handle shaft 18 is disposed on the first side, the cap member 19 is attached to the second through-hole 13a.

Figure 4:
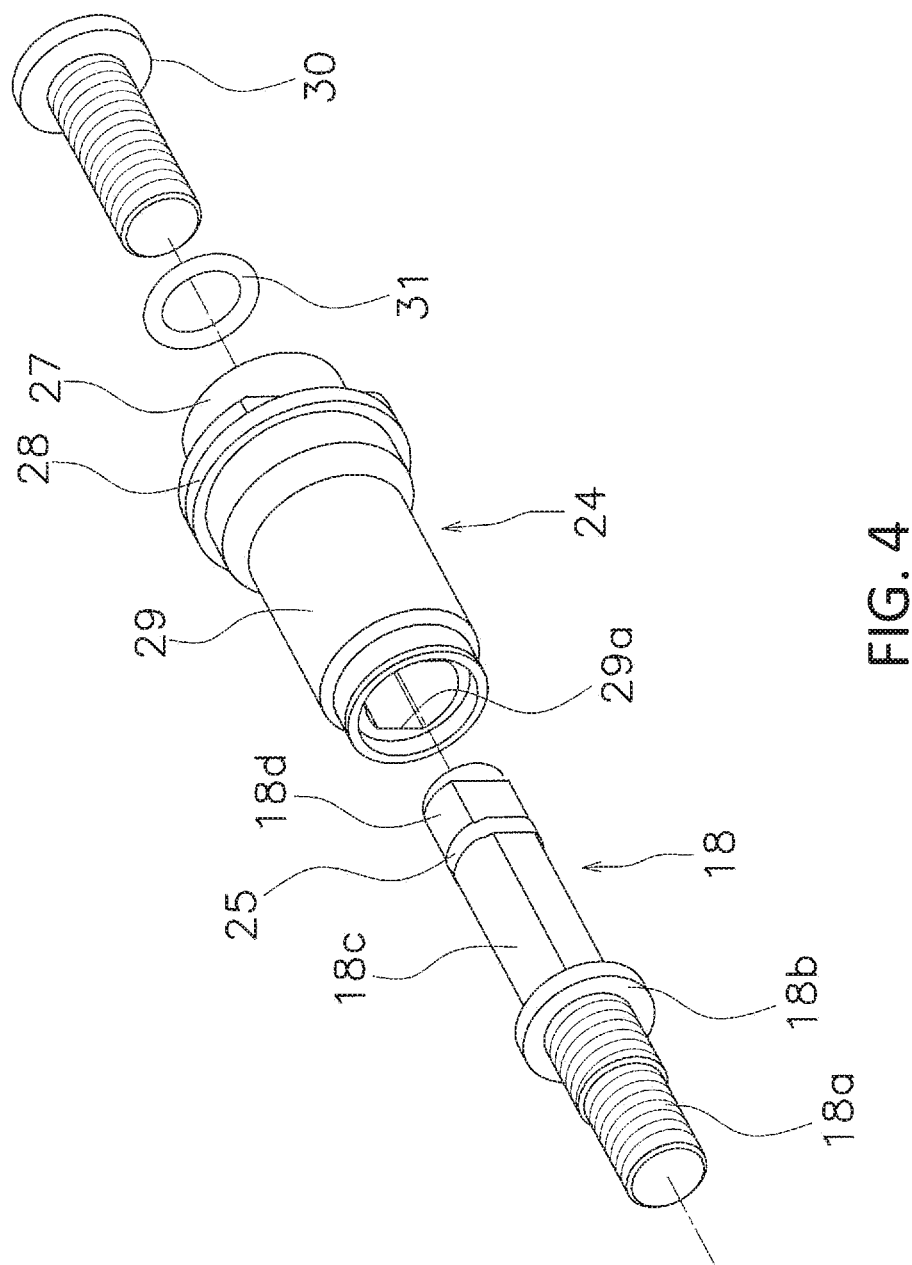
FIG. 4 is an exploded perspective view of a portion of the gear mechanism in the first embodiment.
Figure 5:
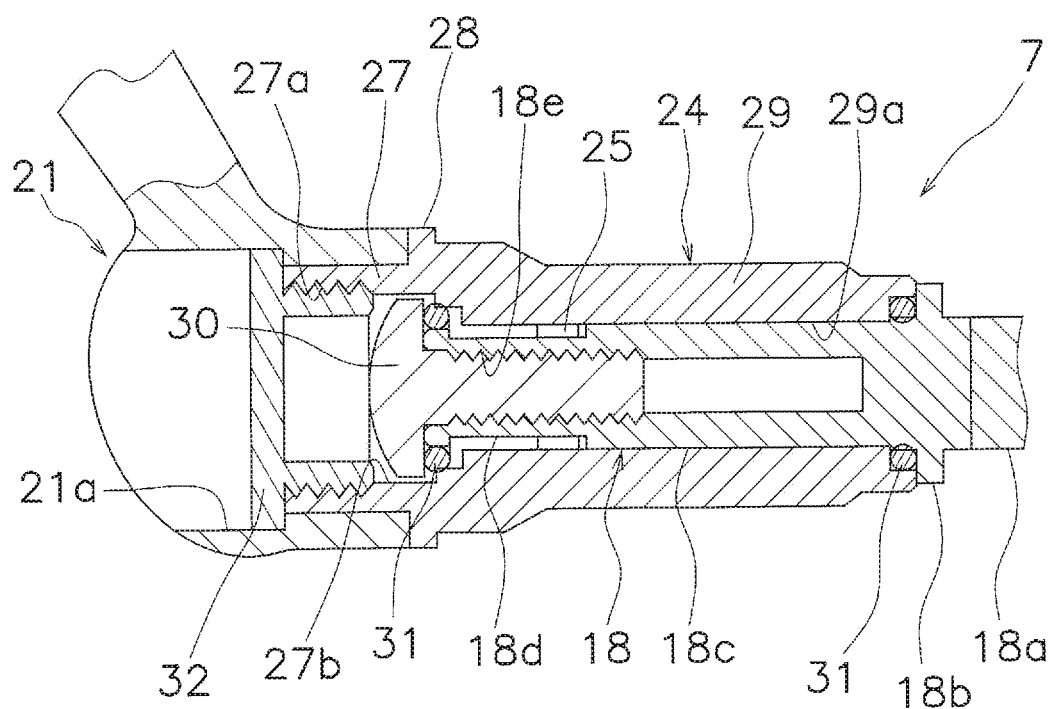
FIG. 5 is a partial cross-sectional view of the gear mechanism of the first embodiment.

As shown in FIG. 4 and FIG. 5, a male threaded portion 18a, an annular shaft flange portion 18b, a large-dimension portion 18c, and a small-dimension portion 18d are formed on the handle shaft 18 from the inner end (the end positioned inside the reel body 1) toward the outer end (the end positioned outside the reel body 1).

The male threaded portion 18a is formed at the inner end portion of the handle shaft 18, and a male thread is formed on the outer perimeter thereof. This male threaded portion 18a and the female threaded portion 17a formed on the inner periphery of the drive shaft 17 are threaded together. The handle shaft 18 is thereby threaded and fixed to the drive shaft 17, and is integrally rotated with the drive shaft 17.

The small-dimension portion 18d has a smaller dimension than the dimension of the large-dimension portion 18c. The cross-sectional shape of the large-dimension portion 18c and the small-dimension portion 18d is an oval shape. Further, the handle shaft 18 has a screw hole 18e that extends through the inside of the small-dimension portion 18d from the outer end of the handle shaft 18.

As shown in FIG. 3, the gear 16 is coupled to the driveshaft 17, and is integrally rotated with the driveshaft 17. The gear 16 is a face gear, and meshes with the pinion gear 3. The handle shaft 18, the driveshaft 17, and the gear 16 are rotated, and the pinion gear 3 is also rotated, by rotating the handle 7 that is attached to the reel body 1. Accompanying the rotation of the pinion gear 3, the oscillating mechanism 10 reciprocates the spool shaft 4 in the longitudinal direction.

As shown in FIG. 3 and FIG. 5, the handle 7 is mounted to the handle shaft 18. The handle 7 comprises a handle arm 21, a handle grip 22 that is mounted to the distal end of the handle arm 21 (refer to FIG. 1), and a tubular member 24.

The handle arm 21 extends in a direction that axially intersects the drive gear shaft 15. The handle arm 21 comprises a through-hole 21a that extends through in the axial direction, on the proximal end side, which is the side that is attached to the handle shaft 18 (more accurately, to the tubular member 24 described later). A portion of the distal end surface of the inner end of the through-hole 21a is formed in an oval shape.

Figure 6:
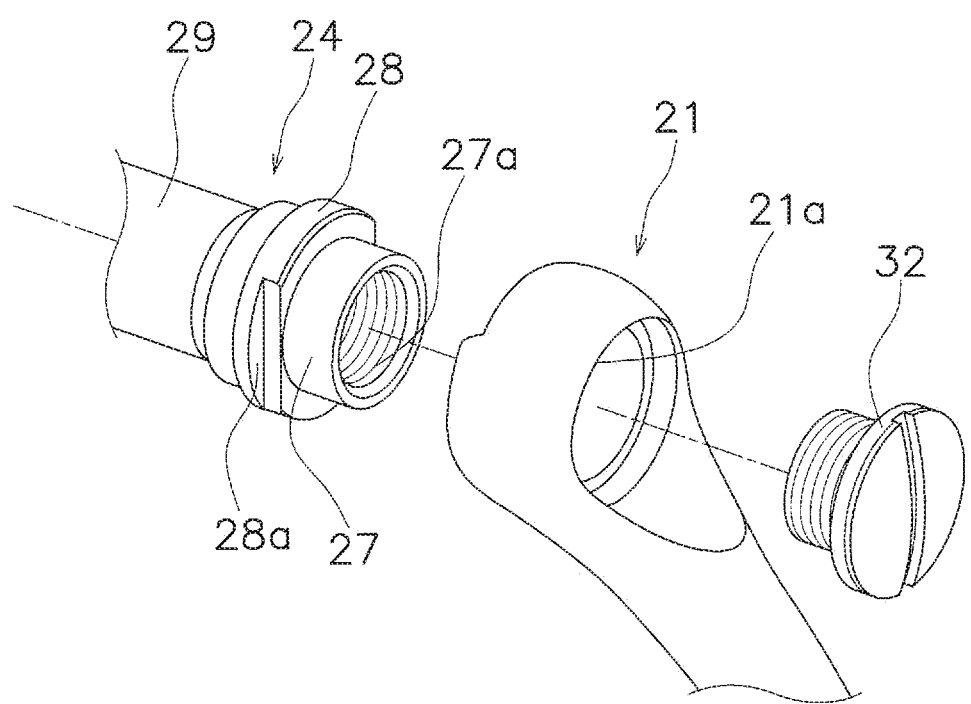
FIG. 6 is an exploded perspective view of a portion of the gear mechanism in the first embodiment.

As shown in FIG. 4, FIG. 5, and FIG. 6, the tubular member 24 comprises, in order from the outer end, a boss portion 27, a flange portion 28, and an engagement portion 29. The large-dimension portion 18c and the small-dimension portion 18d of the handle shaft 18 are disposed on the inside of the tubular member 24. The tubular member 24 can be member made of, for example, metal.

The boss portion 27 is formed on the outer end portion of the tubular member 24, and a female threaded portion 27a is disposed on the distal end inner surface thereof. As shown in FIG. 5, a large-diameter hole portion 27b is formed further inside the female threaded portion 27a. The large-diameter hole portion 27b has substantially the same diameter as the internal diameter of the female threaded portion 27a, and is formed larger than the internal diameter of the internal engagement portion 29.

The flange portion 28 is formed to have a larger outer diameter than the outer diameter of the boss portion 27. As shown in FIG. 6, the flange portion 28 is formed such that a portion of the flange portion 28 on the boss portion 27 side has an oval shape, and has a locking surface 28a. The through-hole 21a of the handle arm 21 is fitted to the outer periphery of the boss portion 27 and the locking surface 28a. Then, the screw member 32, which is inserted from the outer side of the through-hole 21a of the handle arm 21 is threaded into the female threaded portion 27a of the boss portion 27. The tubular member 24 is thereby non-rotatably coupled with the handle arm 21. Meanwhile, when connecting the tubular member 24 and the handle arm 21, for example, a resin sheet (not shown) for suppressing rattling may be interposed between the tubular member 24 and the handle arm 21.

The engagement portion 29 comprises an oval-shaped engagement hole 29a in the inner portion. The shape of the engagement hole 29a is substantially the same as the large-dimension portion 18c of the handle shaft 18. In particular, the engagement hole 29a has a prescribed gap from the handle shaft in the rotational direction. The large-dimension portion 18c of the handle shaft 18 is thereby able to engage the engagement hole 29a.

As shown in FIG. 5, a bolt 30 is housed in the tubular member 24, from the central portion to the outer end portion of the tubular member 24 in the longitudinal direction. The bolt 30 is threaded into a screw hole 18e of the handle shaft 18, which is inserted in the inner portion of the tubular member 24, and the head portion thereof is housed in the large-diameter hole portion 27b. The end surface of the tubular member 24 on the inner end side abuts the shaft flange portion 18b of the handle shaft 18, and the tubular member 24 is fixed to the handle shaft 18, by threading the bolt 30 into the screw hole 18e of the handle shaft 18. Meanwhile, seal members 31 are disposed between the head of the bolt 30 and the bottom surface of the large-diameter hole portion 27b, and between the outer peripheral surface of the large-dimension portion 18c of the handle shaft 18 and the inner surface of the distal end of the tubular member 24. The seal members 31 prevent seawater, etc., from intruding into the tubular member 24, and to suppress axial rattling of the handle part 7.

As shown in FIG. 4 and FIG. 5, the vibration damper 25 is formed in an annular shape, and mounted on the outer periphery of the small-dimension portion 18d of the handle shaft 18. The vibration damper 25 is made of resin, for example, and is an elastically deformable elastic member with a lower rigidity than the tubular member 24.

Rotation Transmission Path

In the first embodiment, the vibration damper 25 engages the tubular member 24 and the rotation of the handle arm 21 is transmitted to the handle shaft 18, until the vibration damper 25 is elastically deformed by a prescribed amount. In particular, the vibration damper 25 engages the engagement hole 29a formed on the inner surface of the tubular member 24.

That is, when the line-winding force (rotational force) by the handle arm 21 is small, the rotational force is transmitted along the following transmission path to rotate the rotor 2: handle arm 21→tubular member 24 (engagement hole 29a of the engagement portion 29)→vibration damper 25→handle shaft 18→drive shaft 17→gear 16→pinion gear 3. Here, since the rotational force of the handle arm 21 is transmitted to the drive gear shaft 15 via the vibration damper 25, the vibration due to the engagement of gears is damped and transmitted to the handle arm 21. It is thereby possible to improve the rotation feeling when an angler rotates the handle part 7 in the line winding direction.

Meanwhile, as shown in FIG. 3, the vibration damper 25 preferably includes a dimension D2 (here, the dimension of the drive shaft 17 and the handle shaft 18) of the transmission path that is smaller in diameter than the diameter D1 (here, the diameter of the gear 16) of the gear in which vibration due to the engagement of gears is generated. Further, a greater effect can be expected if the dimension D2 (here, the dimension of the drive shaft 17 and the handle shaft 18) of the small-dimension transmission path to which the vibration damper 25 is provided is smaller than the diameter D1 (here, the diameter of the gear 16) of the gear in which vibration due to the engagement of gears is generated.

After the vibration damper 25 is elastically deformed by a prescribed amount, the handle shaft 18 engages the tubular member 24 and the rotation of the handle arm 21 is transmitted to the handle shaft 18. In particular, when the vibration damper 25 is elastically deformed by a prescribed amount (to a degree at which the gap between the engagement hole 29a of the tubular member 24 and the large-diameter portion 18c of the handle shaft 18 is eliminated), the large-dimension portion 18c and the engagement hole 29a come into contact, and the rotation is directly transmitted from the tubular member 24 to the handle shaft 18.

That is, in the case of a high load with a large line-winding force by the handle arm 21, as described above, the vibration damper 25 is elastically deformed, and the rotational force is transmitted along the following transmission path to rotate the rotor 2: handle arm 21→tubular member 24 (engagement hole 29a)→handle shaft 18 (large-dimension portion 18c)→drive shaft 17→gear 16→pinion gear 3. Here, since the rotational force of the handle arm 21 is directly transmitted to the drive gear shaft 15 without interposing the vibration damper 25, it is possible to quickly and reliably transmit the rotational force.

In this manner, for example, when the load in the rotational direction to wind the fishing line is small, it is possible to transmit the rotation to the drive gear shaft 15 while dampening the vibration of the gear that is transmitted to the handle arm 21, by interposing the vibration damper 25. Further, when a high load is applied, it is possible to reliably transmit the rotation of the handle arm 21 to the drive gear shaft 15, by directly transmitting the rotation from the tubular member 24 to the drive gear shaft 15. Meanwhile, the amount by which the vibration damper 25 can be elastically deformed, is set to greater than or equal to an amount that corresponds to the gap between the engagement portion 29 and the large-dimension portion 18c.

Second Embodiment

Figure 7:
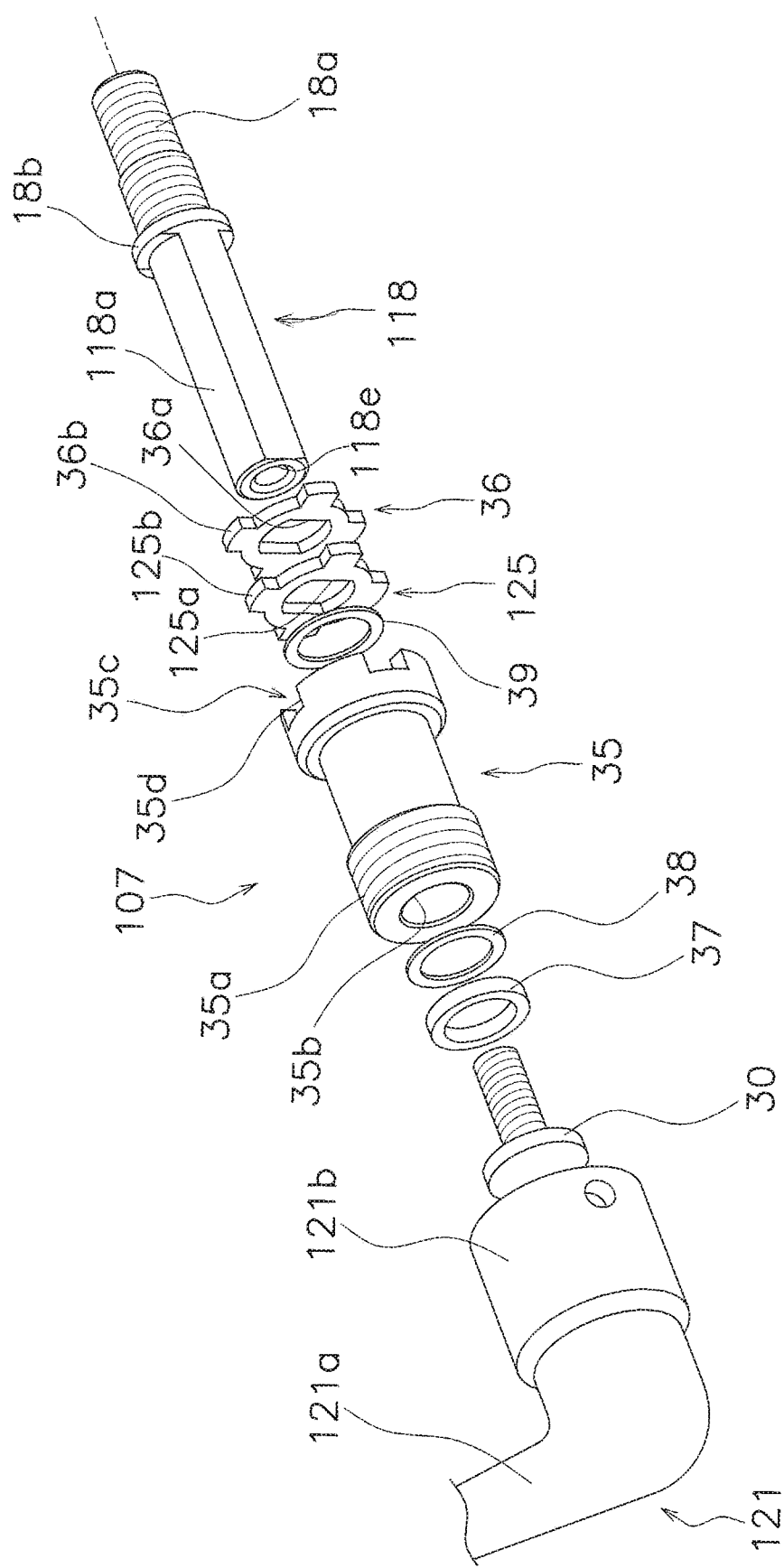
FIG. 7 is a view corresponding to FIG. 4 showing a second embodiment.
Figure 8:
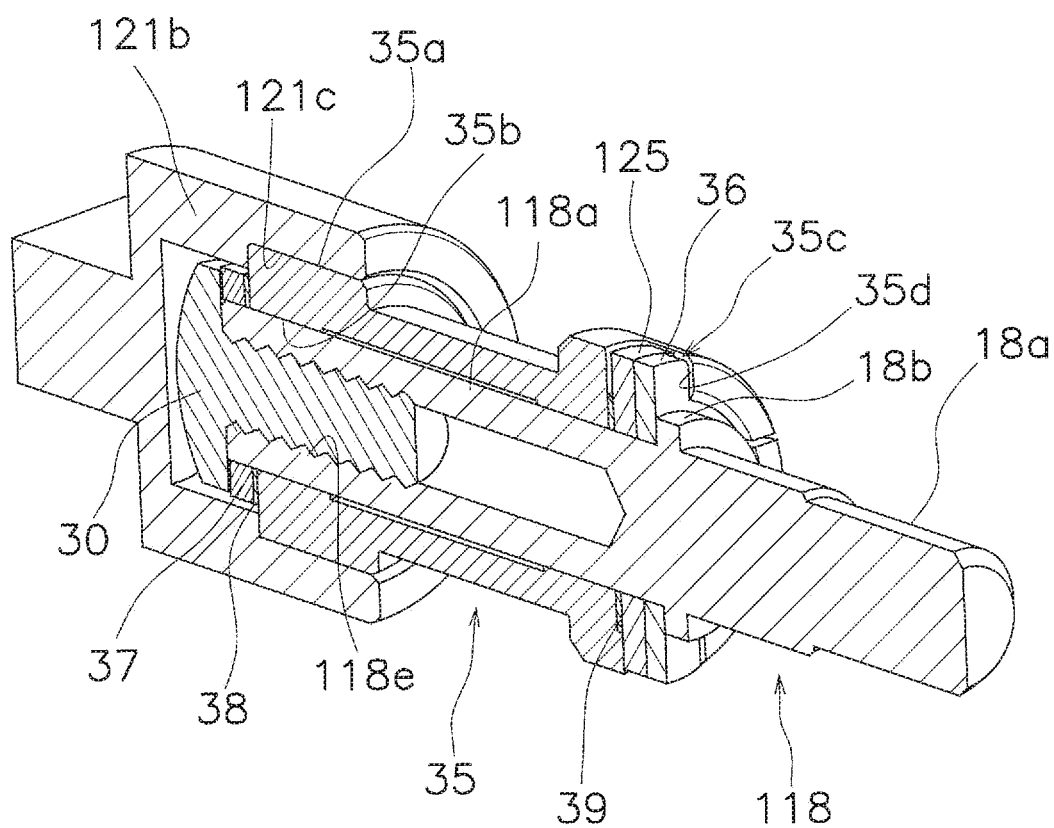
FIG. 8 is a cross-sectional perspective view of a portion of FIG. 7.

FIG. 7 and FIG. 8 are an exploded perspective view and a cross-sectional perspective view of a portion of the gear mechanism 106 in which the second embodiment of the present invention is employed. The overall configuration of the spinning reel in the second embodiment is the same as the spinning reel 100 of the first embodiment, and thus, the description thereof is omitted here. In the second embodiment, only a portion of the handle shaft 118, a portion of the handle 107, and the configuration of the vibration damper 125, are different from the configuration of the first embodiment. Accordingly, configurations that are different from the first embodiment will be described below. Meanwhile, the configurations that are the same as the first embodiment are given the same reference symbols.

The handle shaft 118 of the second embodiment comprises a shaft portion 118a, in addition to the same male threaded portion 18a and shaft flange portion 18b as in the first embodiment. The shaft portion 118a extends from the shaft flange portion 18b to the distal end of the handle shaft 118 on the outer end. The outer dimensions of the shaft portion 118a are uniformly formed. A screw hole 118e that extends axially from the distal end surface of the shaft portion 118a is formed in the center of the shaft portion 118a. The cross-sectional shape of the shaft portion 118a is non-circular, and is formed in an oval shape, in the same manner as in the first embodiment.

The handle 107 is disposed on the outer end of the handle shaft 118. The handle 107 comprises a handle arm 121, a handle grip 22 that is mounted on the distal end of the handle arm 121 (refer to FIG. 1), a first metal member 35 (one example of the first transmitting member), and a second metal member 36 (one example of the second transmitting member).

The handle arm 121 comprises an arm portion 121a, and a boss portion 121b that is integrally rotated with the arm portion 121a. The arm portion 121a extends from the boss portion 121b in a direction that intersects the handle shaft 118. As shown in FIG. 8, a female threaded portion 121c, on the inner surface of which is formed a female thread, is formed on the inner periphery of the boss portion 121b. The outer end portion of the handle shaft 118 is housed in the boss portion 121b.

The first metal member 35 has a tubular shape, and the outer end portion thereof is non-rotatably coupled with the boss portion 121b of the handle arm 121. In particular, a male threaded portion 35a, on the outer peripheral surface of which is formed a male thread, is formed in the outer end portion of the first metal member 35, and this male threaded portion 35a is threaded into the female threaded portion 121c, which is formed in the inner periphery of the boss portion 121b of the handle arm 121.

The first metal member 35 comprises a through-hole 35b and a plurality of pawl receiving portions 35c. The shaft portion 118a of the handle shaft 118 is inserted into the through-hole 35b.

Each of the plurality of pawl receiving portions 35c is axially recessed from an end surface of the first metal member 35, on the side into which the handle shaft 118 is inserted (inner end side). A pair of side walls 35d are thereby formed in the pawl receiving portion 35c.

Here, a bolt 30 is threaded into the screw hole 118e of the shaft portion 118a of the handle shaft 118 (refer to FIG. 8). Then, an end surface of the bolt 30 abuts the outer end surface of the shaft portion 118a via a buffer member 37 and a washer 38. In this manner, by threading the bolt 30 into screw hole 118e of the handle shaft 118, and abutting the head portion of the bolt 30 to the end surface of the shaft portion 118a via the buffer member 37, etc., the inner end surface of the first metal member 35 abuts the shaft flange portion 18b of the handle shaft 118 via a washer 39, the vibration damper 125 and the second metal member 36. The first metal member 35 is thereby fixed to the handle shaft 118. Meanwhile, the buffer member 37 functions to dampen the vibration in the axial direction, as well as to prevent the loosening of the bolt 30.

The second metal member 36 is formed in a plate shape, and comprises a through-hole 36a and a plurality of metal pawls (one example of a transmission pawl) 36b. The through-hole 36a is a non-circular hole that engages the shaft portion 118a of the handle shaft 118. The second metal member 36 is thereby non-rotatably attached to the handle shaft 118. The second metal member 36 is configured to have a higher rigidity than the vibration damper 125. Meanwhile, the second metal member 36 is sandwiched between the pawl receiving portion 35c of the first metal member 35 and the shaft flange portion 18b of the handle shaft 118, such that the movement thereof in the axial direction is restricted.

Figure 9:
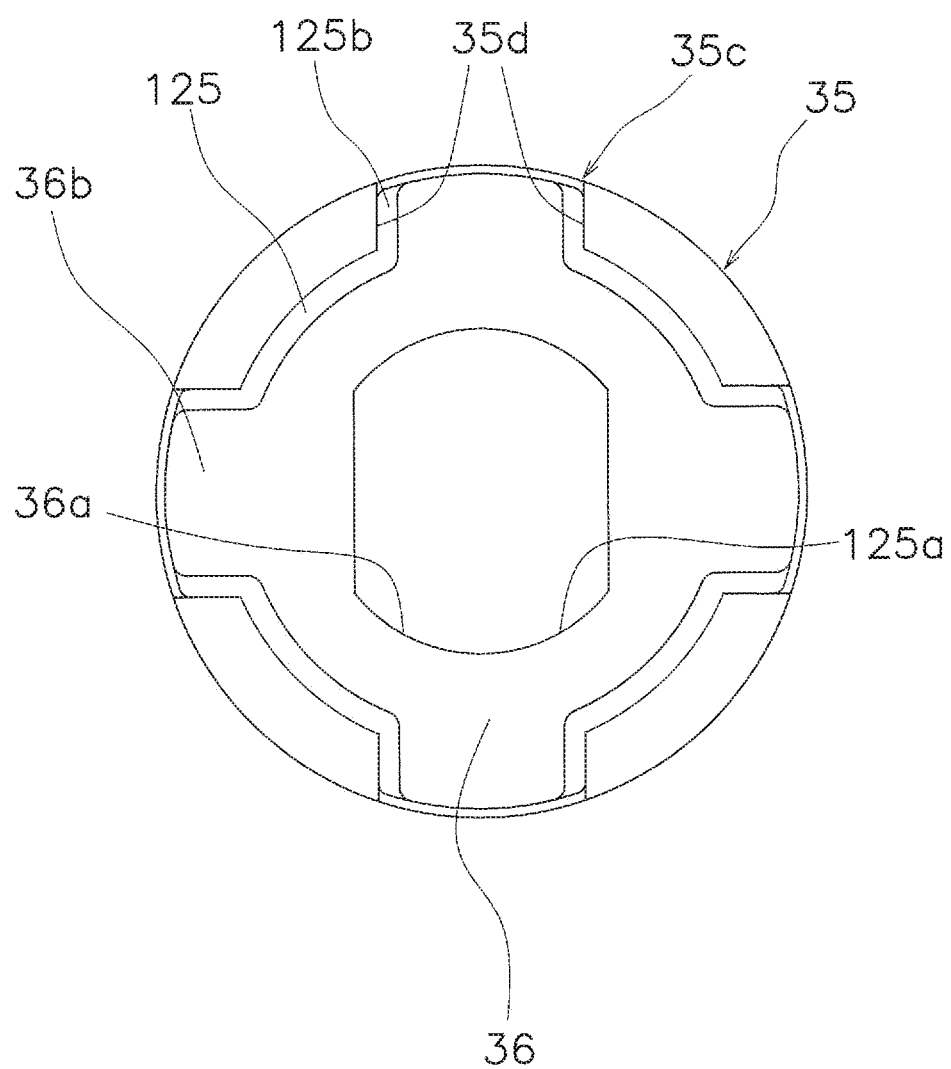
FIG. 9 is a view of a vibration damper and a second metal member disposed on the first metal member of the second embodiment.

Each of the plurality of metal pawls 36b extends radially outwardly from the through-hole 36a. The metal pawls 36b are disposed so as to be capable of engaging at least one of the pair of side walls 35d of the pawl receiving portion 35c, when the handle arm 121 is rotated in the line winding direction. In particular, as shown in FIG. 9, the metal pawls 36b are formed such that the circumferential widths are narrower than those of the elastic pawl 125b. Accordingly, the metal pawls 36b are disposed so as to not abut the pair of side walls 35d when the handle arm 121 is not rotating.

As shown in FIG. 7 and FIG. 9, the vibration damper 125 is formed in a plate shape, and comprises a through-hole 125a and a plurality of elastic pawls 125b. The vibration damper 125 is made of resin, for example, and is an elastically deformable elastic member with a lower rigidity than the first metal member 35. The through-hole 125a is a non-circular hole that engages the shaft portion 118a of the handle shaft 118. The vibration damper 125 is thereby non-rotatable relative to the handle shaft 118.

Each of the plurality of elastic pawls 125b extends radially outwardly from the through-hole 125a. The elastic pawls 125b engage the pawl receiving portions 35c of the first metal member 35. In particular, the elastic pawls 125b of the vibration damper 125 are disposed abutting the pair of side walls 35d of the pawl receiving portions 35c. Meanwhile, as shown in FIG. 8, the vibration damper 125 is sandwiched between the pawl receiving portions 35c and the shaft flange portion 18b of the handle shaft 118, such that the movement thereof in the axial direction is restricted.

Rotation Transmission Path

In the second embodiment, the vibration damper 125 engages the pawl receiving portions 35c of the first metal member 35, and the rotation of the handle arm 121 is transmitted to the handle shaft 118, until the vibration damper 125 is elastically deformed by a prescribed amount. In particular, the elastic pawls 125b of the vibration damper 125 engage the side walls 35d of the pawl receiving portions 35c of the first metal member 35, and the rotation of the handle arm 121 is transmitted to the handle shaft 118.

That is, when the line-winding force (rotational force) by the handle arm 121 is small, the rotational force is transmitted along the following transmission path to rotate the rotor 2: handle arm 121→first metal member 35 (pawl portions 35c)→vibration damper 125 (elastic pawls 125b) →handle shaft 118→drive shaft 17→gear 16→pinion gear 3. Here, since the rotational force of the handle arm 121 is transmitted to the drive gear shaft 15 via the vibration damper 125, the vibration due to the engagement of gears is dampened and transmitted to the handle arm 121. It is thereby possible to improve the rotation feeling when an angler rotates the handle part 107 in the line winding direction.

Then, after the vibration damper 125 is elastically deformed by a prescribed amount, the second metal member 36 engages the first metal member 35 and the rotation of the handle arm 121 is transmitted to the handle shaft 118. In particular, when the elastic pawls 125b of the vibration damper 125 are elastically deformed by a prescribed amount, the metal pawls 36b with a narrower circumferential width than the elastic pawls 125b engage the pawl receiving portions 35c of the first metal member 35.

That is, in the case of a high load with a large line winding force by the handle arm 121, as described above, the vibration damper 125 is elastically deformed, and the rotational force is transmitted along the following transmission path to rotate the rotor 2: handle arm 121→first metal member 35 (pawl portions 35c)→second metal member 36 (metal pawls 36b)→handle shaft 118→drive shaft 17→gear 16→pinion gear 3. Here, since the rotational force of the handle arm 121 is directly transmitted to the drive gear shaft 15 without interposing the vibration damper 125, it is possible to quickly and reliably transmit the rotational force.

As described above, in the second embodiment as well, for example, when the load in the rotational direction to wind the fishing line is small, the rotation of the handle arm 121 is transmitted to the drive gear shaft 15 via the vibration damper 125, and rotation is transmitted via the second metal member 36 when a high load is applied; therefore, the same effects as in the first embodiment can be obtained. Further, in the same manner as the first embodiment, since the vibration damper 125 is disposed in a transmission path (here, the diameter of the first metal member 35 (pawl receiving portion 35c), the second metal member 36 (metal pawl 36b), and the handle shaft 118) with a smaller dimension than the diameter (here, the diameter of the gear 16) of the gear in which vibration due to the engagement of gears is generated, it is possible to effectively damp the vibration.

Modified Example of the Second Embodiment

Figure 10:
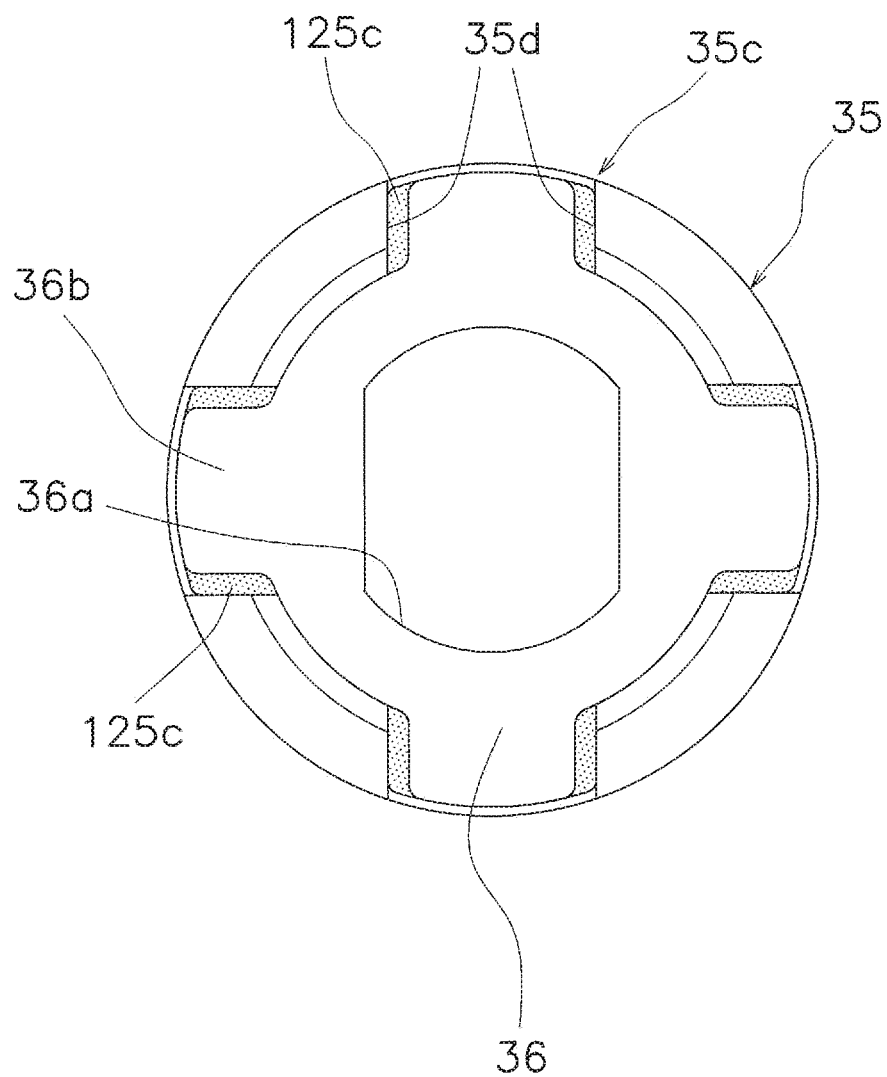
FIG. 10 is a view corresponding to FIG. 9, showing a modified example of the second embodiment.

In a modified example of the second embodiment, only the configuration of the vibration damper 125 of the second embodiment is changed. Here, as shown in FIG. 10, the vibration damper 125c is fixed to both side surfaces of the metal pawl 36b of the second metal member 36. That is, the vibration damper 125c is disposed so as to fill the gaps in the pawl receiving portions 35c of the first metal member 35 and the metal pawl 36b of the second metal member 36. The rotation of the handle arm 121 can thereby be transmitted to the handle shaft 118 by the presence of the metal pawl 36b, even when a load is applied in a rotational direction for winding the fishing line and the vibration damper 125c is elastically deformed.

Meanwhile, in the modified example of the second embodiment, since the vibration damper 125c is disposed between the portion where the pawl receiving portion 35c engages the metal pawl 36b, the pawl receiving portion 35c and the metal pawl 36b will not come in contact and engage even when the vibration damper 125c is elastically deformed. Accordingly, unlike the second embodiment, the rotation of the first metal member 35 is always transmitted to the second metal member 36 via the vibration damper 125c, even when the vibration damper 125c is elastically deformed by a prescribed amount.

Third Embodiment

Figure 11:
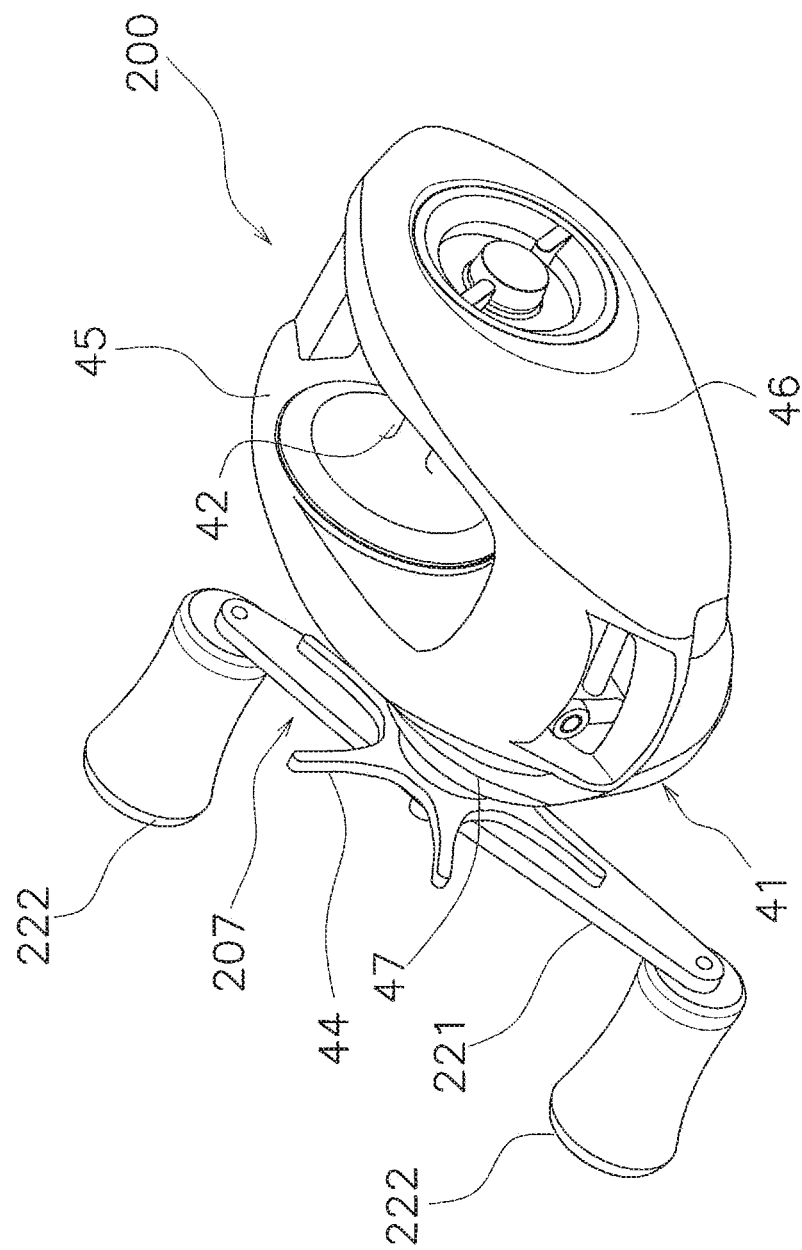
FIG. 11 is a perspective view of the dual-bearing reel of a third embodiment.
Figure 12:
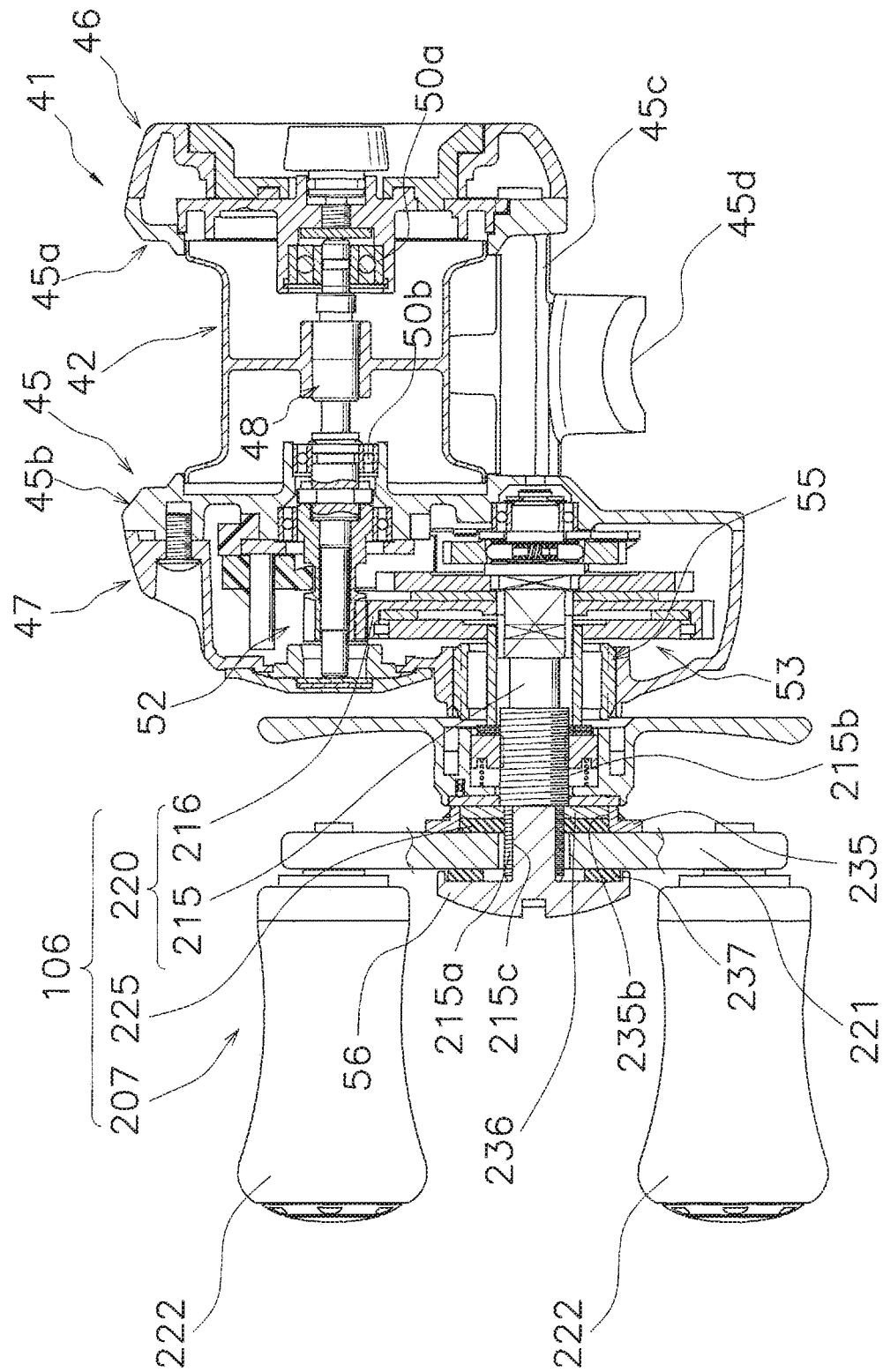
FIG. 12 is a cross-sectional view of the dual-bearing reel of the third embodiment.

As shown in FIG. 11 and FIG. 12, the dual-bearing reel 200, which employs the third embodiment of the present invention, comprises a reel body 41, a spool 42, and a gear mechanism 106.

The reel body 41 comprises a frame 45, a first side cover 46 and second side cover 47 that are mounted so as to cover the two sides of the frame 45, and a front cover (not shown) that is mounted to the front of the frame 45.

As shown in FIG. 12, the frame 45 comprises a first side plate 45a and a second side plate 45b that are arranged so as to face each other across a prescribed interval, a plurality of connecting portions 45c that connect the first side plate 45a and the second side plate 45b, and a mounting portion 45d that is mounted to the fishing rod.

As shown in FIG. 12, the spool 42 is disposed between the first side plate 45a and the second side plate 45b. A fishing line is wound on the outer perimeter surface of the spool 42. The spool 42 is fixed to a spool shaft 48 that extends through the center of the spool 42, and is integrally rotated with the spool shaft 48. The two ends of the spool shaft 48 are rotatably supported with respect to the reel body 41 by axle bearing members 50a, 50b.

As shown in FIG. 12, the gear mechanism 206 comprises a drive gear 220, a pinion gear 52, a drag mechanism 53, a handle 207, and a vibration damper 225.

The drive gear 220 comprises a drive gear shaft 215 and a gear 216 that has a prescribed gear diameter.

Figure 13:
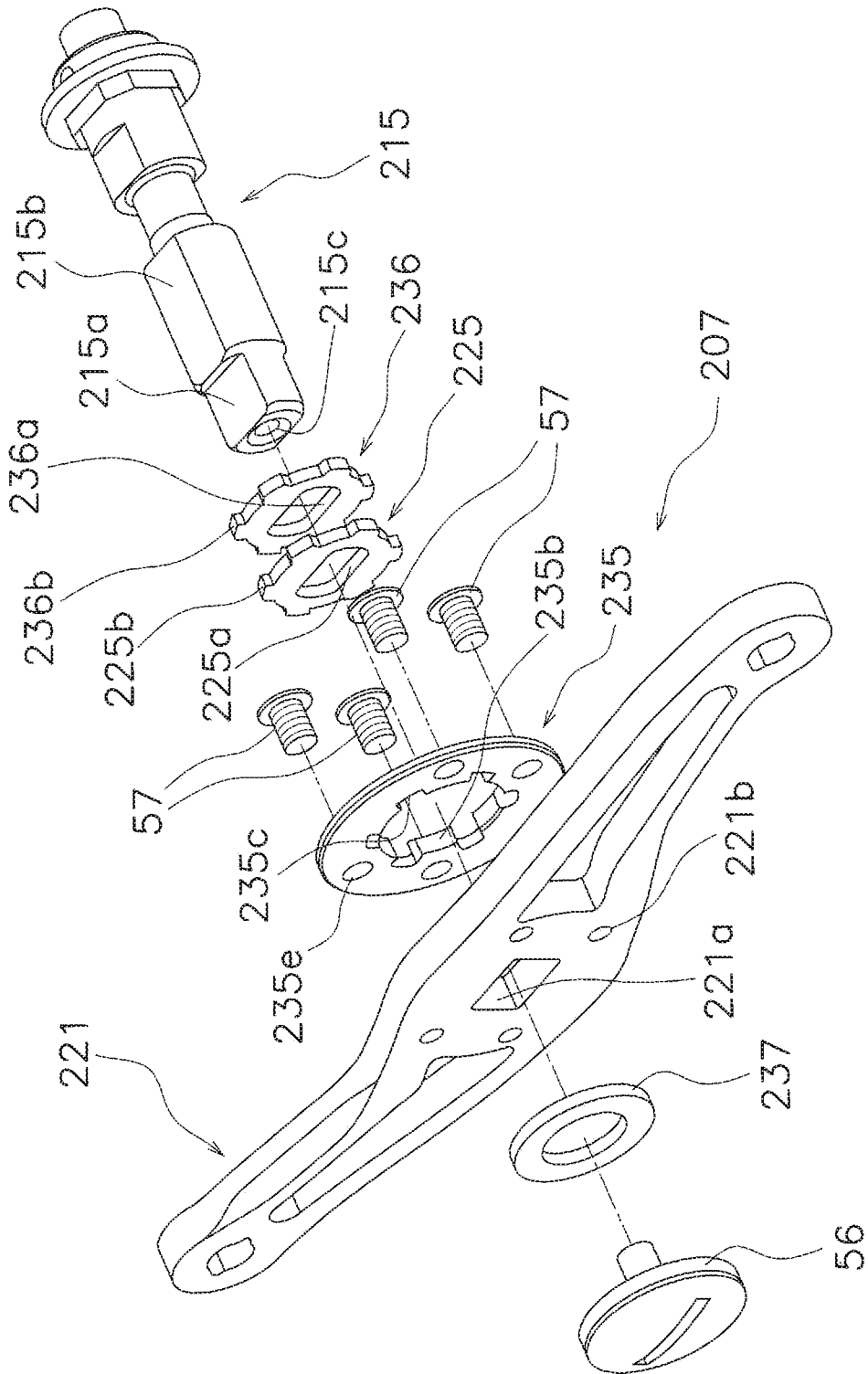
FIG. 13 is an exploded perspective view of a portion of the gear mechanism in the third embodiment.

As shown in FIG. 13, the drive gear shaft 215 comprises a first shaft portion 215a, a second shaft portion 215b, and a screw hole 215c. The drive gear shaft 215 can have a smaller dimension than the diameter of the gear 216. Meanwhile, the drive gear shaft 215 is prevented from rotating in the line delivering direction (casting direction) by a one-way clutch 55 (refer to FIG. 12) that is disposed on the outer perimeter of the drive gear shaft 215.

The first shaft portion 215a is formed on the outer portion of the drive gear shaft 215. The second shaft portion 215b extends from the first shaft portion 215a to the inner end, and can have larger dimensions than the dimensions of the first shaft portion 215a. The cross-sectional shape of the first shaft portion 215a and the second shaft portion 215b is non-circular, and is an oval shape here. The screw hole 215c extends from an end surface of the first shaft portion 215a through the inside of the first shaft portion 215a.

The gear 216 is attached to the drive gear shaft 215. The gear 216 is rotated together with the drive gear shaft 215. The pinion gear 52 meshes with the gear 216. The drag mechanism 53 brakes the rotation of the spool 42 in the line-delivering direction. Here, a detailed description of the drag mechanism 53 is omitted.

The handle 207 is attached to the first shaft portion 215a of the drive gear shaft 215. The handle 207 comprises a handle arm 221, handle grips 222 that are mounted on the ends of the handle arm 221, a first metal member 235 (one example of the first transmitting member), and a second metal member 236 (one example of the second transmitting member).

The handle arm 221 extends in a direction that axially intersects the drive gear shaft 215. As shown in FIG. 13, the handle arm 221 comprises a through-hole 221a that extends through the center in the axial direction. A plurality of female threaded portions 221b that extend through in the axial direction are formed around the periphery of the through-hole 221a. Female threads are formed on the inner surface of the female threaded portions 221b.

As shown in FIG. 13, the first metal member 235 has a plate shape, and comprises a through-hole 235b, a plurality of pawl receiving portions 235c, and a plurality of locking holes 235e.

The first shaft portion 215a of the drive gear shaft 215 extends through the through-hole 235b. Here, a bolt 56 extends through the through-hole 221a of the handle arm 221 from the outer end side of the handle arm 221, and is threaded into the screw hole 215c of the first shaft portion 215a (refer to FIG. 12). Then, an end surface of the bolt 56 abuts the outer surface of the handle arm 221 via a buffer member 237. In this manner, by threading the bolt 56 into screw hole 215c of the drive gear shaft 215, and abutting the head portion of the bolt 56 to the outer surface of the handle arm 221 via the buffer member 237, the inner side surface of the handle arm 221 abuts the outer end surface of the second shaft portion 215b of the drive gear shaft 215 via the vibration damper 225 and the second metal member 236. The handle arm 221 is thereby attached to the drive gear shaft 215. The buffer member 237 damps the vibration in the axial direction, as well as prevents loosening of the bolt 56.

Figure 14:
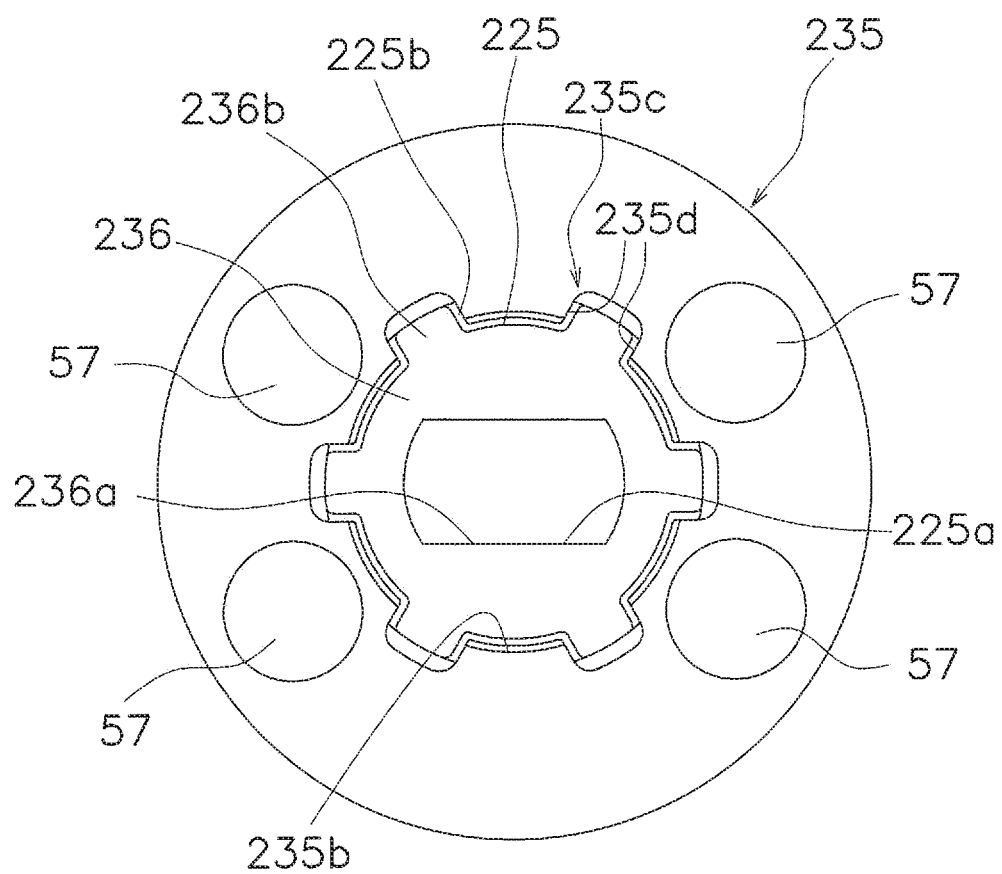
FIG. 14 is a view of a vibration damper and a second metal member disposed on the first metal member of the third embodiment.

Each of the plurality of pawl receiving portions 235c is recessed radially outwardly from the through-hole 235b. As shown in FIG. 14, a pair of side walls 235d are thereby formed in each pawl receiving portion 235c.

Each of the plurality of locking holes 235e is formed radially outwardly of the pawl receiving portion 235c. Screws 57 extend through locking holes 235e from the reel body 41 side of the first metal member 235, and are threaded into the female threaded portion 221b of the handle arm 221. The first metal member 235 is thereby non-rotatably coupled with the handle arm 221.

The second metal member 236 is formed in a plate shape, and comprises a through-hole 236a and a plurality of metal pawls (one example of a transmission pawl) 236b. The through-hole 236a is a non-circular hole that is engaged by the first shaft portion 218a. The second metal member 236 is thereby non-rotatably attached to the drive gear shaft 215. The second metal member 236 can have a higher rigidity than the vibration damper 225.

Each of the plurality of metal pawls 236b extends radially outwardly from the through-hole 236a. The metal pawls 236b are disposed so as to be capable of engaging at least one of the pair of side walls 235d of the pawl receiving portions 235c, when the handle arm 221 is rotated in the line-winding direction. In particular, as shown in FIG. 14, the metal pawls 236b are formed such that the circumferential widths are narrower than those of the elastic pawls 225b described later. Accordingly, the metal pawls 236b are disposed so as to not abut with the pair of side walls 235d, in a state in which the handle arm 221 is not being rotated.

The vibration damper 225 is formed in a plate shape, and comprises a through-hole 225a and a plurality of elastic pawls 225b. The vibration damper 225 can be made of resin, for example, and is an elastically deformable elastic member with a lower rigidity than the first metal member 235.

The through-hole 225a is a non-circular hole that engages with the first shaft portion 218a. The vibration damper 225 is thereby non-rotatable with respect to the handle shaft 218.

Each of the plurality of elastic pawls 225b extends radially outwardly from the through-hole 225a. The elastic pawls 225b engage the pawl receiving portions 235c. In particular, as shown in FIG. 14, the elastic pawls 225b of the vibration damper 225 are disposed abutting the pair of side walls 235d of the pawl receiving portions 235c.

Rotation Transmission Path

The rotation transmission path of the third embodiment has the same configuration as the second embodiment, and follows the same rotation transmission path as that of the second embodiment. Therefore, a detailed description is omitted here.

Other Embodiments

The present invention is not limited to the above-described embodiments, and various modifications and adjustments are possible. Especially, the various embodiments and modified examples described in the present Specification can be freely combined according to necessity.

In the first embodiment, a large-dimension portion 18c and a small-dimension portion 18d are formed on the handle shaft 18, and a vibration damper 25 is attached to the outer periphery of the small-dimension portion 18d; however, the handle shaft 18 can be configured to have a uniform outer dimension, and an elastic member made of rubber or resin may be attached to a groove provided in the outer periphery of the handle shaft 18.

In the first embodiment, the engagement hole 29a of the engagement portion 29 is engaged by having an oval shape, but the shape is not limited to an oval shape. The hole may be engaged being having a polygonal shape, a D cut, a key, or a spline. Additionally, regarding the second and third embodiments, as well, the elastic pawls 125b, 225b and metal pawls 36b, 236b engage a plurality of pawl receiving portions 35c, 235c, but it suffices to have at least one engagement portion.

In the modified example of the second embodiment, it suffices to provide a vibration damper 125c at least to a portion where the first metal member 35 engages the second metal member 36. Further, the vibration damper 125c may be integrally provided on the first or the second metal member 35, 36, covering the first or the second metal member 35, 36.

The tubular member in the first embodiment, and the first and second metal members in the second and third embodiments, may be formed by a material other than metal, as long as the rigidity is higher than that of the vibration damper.

The modified example of the second embodiment may also be applied to the third embodiment.

In all of the embodiments, it is preferable that the vibration damper is provided in a transmission path with a smaller diameter than the diameter of the gear in which vibration due to the engagement of gears is generated, which allows a more effective damping of the vibration.

What is claimed is:

1. A gear mechanism for a fishing reel, comprising:
a drive gear having a gear with a prescribed diameter and a drive gear shaft configured to be rotated together with the gear and having a smaller dimension than the prescribed diameter of the gear, the drive gear shaft including a handle shaft, and the handle shaft having a large-dimension portion and a small-dimension portion, the small-dimension portion having a smaller dimension than a dimension of the large-dimension portion; and
a handle configured to rotate with the drive gear shaft, the handle comprising
a handle arm extending in a direction that axially intersects the drive gear shaft,
a first transmitting member non-rotatably coupled to the handle arm and having an engaged portion, the first transmitting member being a tubular member with an inner surface, and configured to rotate with the drive gear shaft; and
a second transmitting member having an engaged portion to which a rotational force is capable of being transmitted from the engaged portion of the first transmitting member,
a vibration damper having an internal surface and being disposed between the drive gear shaft and the first transmitting member of the handle, and configured to dampen transmission of vibration of the drive gear, the vibration damper being formed in an entirely annular shape along an entirety of the internal surface thereof, the entirety of the internal surface of the vibration damper extending around an outer surface of the small-dimension portion of the handle shaft and an outer surface of the vibration damper being disposed along the inner surface of the first transmitting member, and
the vibration damper abutting the engaged portion of the first transmitting member and the engaged portion of the second transmitting member, being configured to transmit the rotation of the first transmitting member to the second transmitting member, and having a lower rigidity than the first and second transmitting members, and capable of being elastically deformed.

2. The gear mechanism for a fishing reel recited in claim 1, wherein
the first transmitting member has an engagement portion forming a prescribed gap from the drive gear shaft in an inner portion thereof in a rotational direction,
the vibration damper being disposed in at least a portion of the prescribed gap.

3. The gear mechanism for a fishing reel recited in claim 2, wherein the vibration damper engages the engaged portion of the first transmitting member, and is an elastic member with a lower rigidity than that of the first transmitting member.

4. The gear mechanism for a fishing reel recited in claim 3,
wherein
the engaged portion of the first transmitting member is configured to engage the engaged portion of the second transmitting portion after the vibration damper is elastically deformed by a prescribed amount.

5. The gear mechanism for a fishing reel recited in claim 4,
wherein
the large-dimension portion and the small-dimension portion are disposed in the inner portion of the first transmitting member, and
the large-dimension portion is configured to engage the engagement portion of the tubular member after the vibration damper has been elastically deformed by a prescribed amount.

6. The gear mechanism for a fishing reel recited in claim 2,
wherein
the first transmitting member is made of a metal.

7. The gear mechanism for a fishing reel recited in claim 1, wherein
the vibration damper has a continuous annular inner surface.

* * * * *